United States Patent
Lai et al.

(10) Patent No.: US 11,756,317 B2
(45) Date of Patent: Sep. 12, 2023

(54) METHODS AND SYSTEMS FOR LABELING LIDAR POINT CLOUD DATA

(71) Applicant: Argo AI, LLC, Pittsburgh, PA (US)

(72) Inventors: Wei-Liang Lai, Pittsburgh, PA (US); Henry Randall Burke-Sweet, Pittsburgh, PA (US); William Tyler Krampe, Sewickley, PA (US)

(73) Assignee: ARGO AI, LLC, Pittsburgh, PA (US)

( * ) Notice: Subject to any disclaimer, the term of this patent is extended or adjusted under 35 U.S.C. 154(b) by 78 days.

(21) Appl. No.: 17/030,669

(22) Filed: Sep. 24, 2020

(65) Prior Publication Data
US 2022/0092291 A1    Mar. 24, 2022

(51) Int. Cl.
| | |
|---|---|
| *G06V 20/00* | (2022.01) |
| *G06V 20/64* | (2022.01) |
| *G01S 17/42* | (2006.01) |
| *G06T 7/11* | (2017.01) |

(Continued)

(52) U.S. Cl.
CPC ............ *G06V 20/647* (2022.01); *G01S 17/42* (2013.01); *G06T 7/11* (2017.01); *G06T 11/203* (2013.01); *G06V 10/25* (2022.01); *G06T 2207/10028* (2013.01); *G06T 2207/20081* (2013.01); *G06T 2210/12* (2013.01)

(58) Field of Classification Search
CPC ...... G06V 20/647; G06V 10/25; G01S 17/42; G06T 7/11; G06T 11/203; G06T 2207/10028; G06T 2207/20081; G06T 2210/12

See application file for complete search history.

(56) References Cited

U.S. PATENT DOCUMENTS

| | | |
|---|---|---|
| 9,904,867 B2 | 2/2018 | Fathi et al. |
| 10,169,678 B1 * | 1/2019 | Sachdeva ............. G06T 15/205 |
| 10,169,680 B1 | 1/2019 | Sachdeva et al. |

(Continued)

FOREIGN PATENT DOCUMENTS

KR    10-2019-0095592 A    8/2019

OTHER PUBLICATIONS

Piewak, F. et al., "Boosting LiDAR-Based Semantic Labeling by Cross-Modal Training Data Generation," arXiv:1804.09915v1 [cs. CVI] Apr. 26, 2018, pp. 1-16.

(Continued)

*Primary Examiner* — Nay A Maung
*Assistant Examiner* — Xiao Liu
(74) *Attorney, Agent, or Firm* — FOX ROTHSCHILD LLP (57) ABSTRACT

Systems and methods for processing point cloud data are disclosed. The methods include receiving a 3D image including point cloud data, displaying a 2D image of the 3D image, and generating a 2D bounding box that envelops an object of interest in the 2D image. The methods further include generating a projected image frame comprising a projected plurality of points by projecting a plurality of points in a first direction. The methods may then include displaying an image frame that includes the 2D image and the 2D bounding box superimposed by the projected image frame, receiving a user input that includes an identification of a set of points in the projected plurality of points that correspond to the object of interest, identifying a label for the object of interest, and storing the set of points that correspond to the object of interest in association with the label.

34 Claims, 9 Drawing Sheets

(51) Int. Cl.
*G06T 11/20* (2006.01)
*G06V 10/25* (2022.01)

(56) References Cited

U.S. PATENT DOCUMENTS

| | | | |
|---|---|---|---|
| 10,268,926 | B2 | 4/2019 | Feng et al. |
| 10,275,689 | B1 | 4/2019 | Sachdeva et al. |
| 11,023,730 | B1* | 6/2021 | Zhou .................. G06N 3/08 |
| 2013/0300740 | A1* | 11/2013 | Snyder ................ G06T 17/05 |
| | | | 345/419 |
| 2015/0138310 | A1 | 5/2015 | Fan et al. |
| 2017/0220887 | A1* | 8/2017 | Fathi .................. G06V 20/64 |
| 2019/0197778 | A1* | 6/2019 | Sachdeva ............ G06V 20/58 |
| 2019/0213790 | A1 | 7/2019 | Taguchi et al. |
| 2020/0025935 | A1 | 1/2020 | Liang et al. |
| 2020/0174132 | A1 | 6/2020 | Nezhadarya et al. |
| 2020/0200907 | A1 | 6/2020 | Li et al. |
| 2020/0320747 | A1* | 10/2020 | Izumi ................ H04N 13/106 |
| 2021/0199799 | A1* | 7/2021 | Taalimi ............... G06N 20/00 |
| 2021/0407125 | A1* | 12/2021 | Mahendran ............ G06T 7/73 |
| 2022/0012466 | A1* | 1/2022 | Taghavi ............ G06F 18/2163 |

OTHER PUBLICATIONS

Wang, B. et al., "LATTE: Accelerating LiDAR Point Cloud Annotation via Sensor Fusion, One-Click Annotation and Tracking," arXiv:1904.09085v1 [cs:CV] Apr. 19, 2019, pp. 1-8.

"Releasing First Online 3D Point Cloud Labeling Tool in Supervisely," Machine Learning, Deep Systems.AI, Jul. 14, 2019.

Wang, Y. et al., "Label Propagation from ImageNet to 3D Point Clouds," Department of Electrical Engineering, Columbia University, pp. 1-8.

\* cited by examiner

METHODS AND SYSTEMS FOR LABELING LIDAR POINT CLOUD DATA

BACKGROUND

Imaging sensors are used in a wide variety of applications, including autonomous vehicles and robots. For example, autonomous vehicles (AVs) use imaging sensors to detect and localize objects in their environment for safe and accurate navigation. LIDARs and cameras are two essential imaging sensors for perception and scene understanding. They build an environment in tandem and provide a means for detection and localization of other objects, giving robots rich semantic information required for safe navigation.

Optical sensors like cameras have long been used for collection of such image data and generally produce two dimensional (2D) data. More recently, there has been a growing interest in three-dimensional (3D) imaging data. One example of a 3D imaging system that generates one or more image frames of 3D point cloud data is a LIDAR imaging system. In general, such LIDAR systems use a high-energy laser to determine the distance to a target. In a conventional LIDAR system one or more laser pulses is used to illuminate a scene, and measures the time for each pixel of a pulse of light to transit a round-trip path from the laser to the target and back to the detector array. The reflected light from a target is detected and its round-trip travel time is measured to determine the distance to a point on the target. The calculated range or distance information is obtained for a multitude of points comprising the target, thereby creating a 3D point cloud. The 3D point cloud can be used to render the 3D shape of an object.

For detection and localization of objects, AVs typically input the data collected by the imaging sensors into machine learning models trained to identify and localize objects based on the input data. Training of such machine learning models requires training data sets including 2D images from cameras, 3D LIDAR point clouds from LIDAR sensors, and labels representing objects such as vehicles and pedestrians observed in the 2D images and 3D LIDAR point clouds. While identification and labeling of objects in 2D images is a well-understood process, addition of labels to the 3D LIDAR point clouds accurately and comprehensively is a difficult and labor-intensive task that is performed manually by a trained human using a computer tool to indicate and label objects. However, characteristics presented by objects in a point cloud are often not distinctive, and affected by the ground and other sundries as well making them harder to recognize. When faced with a large volume of data to be labeled, manual labeling is relatively slow, and objects with similar features may easily be labeled incorrectly. Existing labeling tools are not user friendly, particularly for 3D point clouds that inherently harder to visualize compared to 2D images leading to low labeling efficiency and visual fatigue. Moreover, they require users to manipulate complex 3D user interfaces on a 2D display leading to both inefficiencies and inaccuracies. Such tools also do not associate an object with the corresponding LIDAR points to localize the object in its 3D environment.

This document describes methods and systems that are directed to addressing the problems described above, and/or other issues.

SUMMARY

In various scenarios, a systems and methods for labeling LIDAR point cloud data are disclosed. The systems may include a processor, a display and a non-transitory computer readable medium including programming instructions that when executed cause the processor to execute various methods discussed below. The system may process point cloud data by receiving a 3D image comprising point cloud data, display a 2D image associated with the 3D image on a user interface, generate a 2D bounding box that envelops an object of interest in the 2D image, and generate a first projected image frame comprising a first projected plurality of points by projecting a plurality of points in the 3D image on the 2D image in a first direction. The system may then display an image frame that comprises the 2D image and the 2D bounding box superimposed by the first projected image frame on a user interface, and receive a first user input comprising an identification of a set of points in the first projected plurality of points that correspond to the object of interest. The system may identify a label for the object of interest, and store the set of points that correspond to the object of interest in association with the label in a data store. Optionally, the plurality of points in the 3D image may be projected on the 2D image in a first direction by projecting each of the plurality of points to a pixel of the 2D image.

In certain of such scenarios, the system may also generate a second projected image frame comprising a second projected plurality of points by projecting the plurality of points in the 3D image on the 2D image in a second direction. Optionally, the system may simultaneously display at least two of: the image frame, the first projected image frame, and/or the second projected image frame on the user interface. Additionally and/or alternatively receiving the first user input may include receiving the first user input via a user interaction with at least one of the following while being displayed on the user interface: the image frame, the first projected image frame, and/or the second projected image frame. The system may also automatically update the image frame, the first projected image frame, and/or the second projected image frame while being simultaneously displayed on the user interface in order to display the first user input.

In some scenarios, the system may also simultaneously display at least two of the image frame zoomed in on the 2D bounding box, the first projected image frame zoomed in on the bounding box, and/or or the second projected image frame zoomed in on the 2D bounding box.

The some implementations, the system may identify a 3D bounding box that envelops the set of points that correspond to the object of interest. Optionally, the 3D bounding may be identified by receiving a second user input via a user interaction with at least one of the following while being displayed on the user interface: the image frame, the first projected image frame, and/or the second projected image frame. The system may then automatically update the image frame, the first projected image frame, and/or the second projected image frame to display the 3D bounding box, while being simultaneously displayed on the user interface. The system may, optionally, store the 3D bounding box in association with the label in a data store. The dimensions of the 3D bounding box may be determined based on at least dimensions of the object of interest in the 2D image.

The system may identify the label by receiving the label from a user and/or automatically as the label associated with the object of interest it the 2D image.

The 2D image may be a camera image that includes an identical scene as the 3D image and is captured within a threshold time as the point cloud data in the 3D image. Optionally, the point cloud data is captured using a LIDAR sensor.

In various scenarios, the system may use the stored set of points that correspond to the object of interest in association with the label for training a machine learning model that is, for example, configured for controlling an autonomous vehicle.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

This document describes a method and system (e.g., tool described below) that will create a labeling interface (e.g., a graphical user interface) including a reference 2D image superimposed with projected LIDAR data for 2D visualization. The labeling interface may also include image frames including other views of projected LIDAR data. The labeling interface is configured to allow a user to easily visualize and discern 3D point cloud data in association with a reference 2D image, where user actions with any image frame in the labeling interface are reflected in all the displayed image frames making it easier to identify LIDAR points associated with an object and to perform labeling. The labeling interface decomposes the problem of labeling a 3D image into one or more steps in a 2D visualization environment, and supports presentation and labeling of a 3D image in a 2D display.

Figure 1:
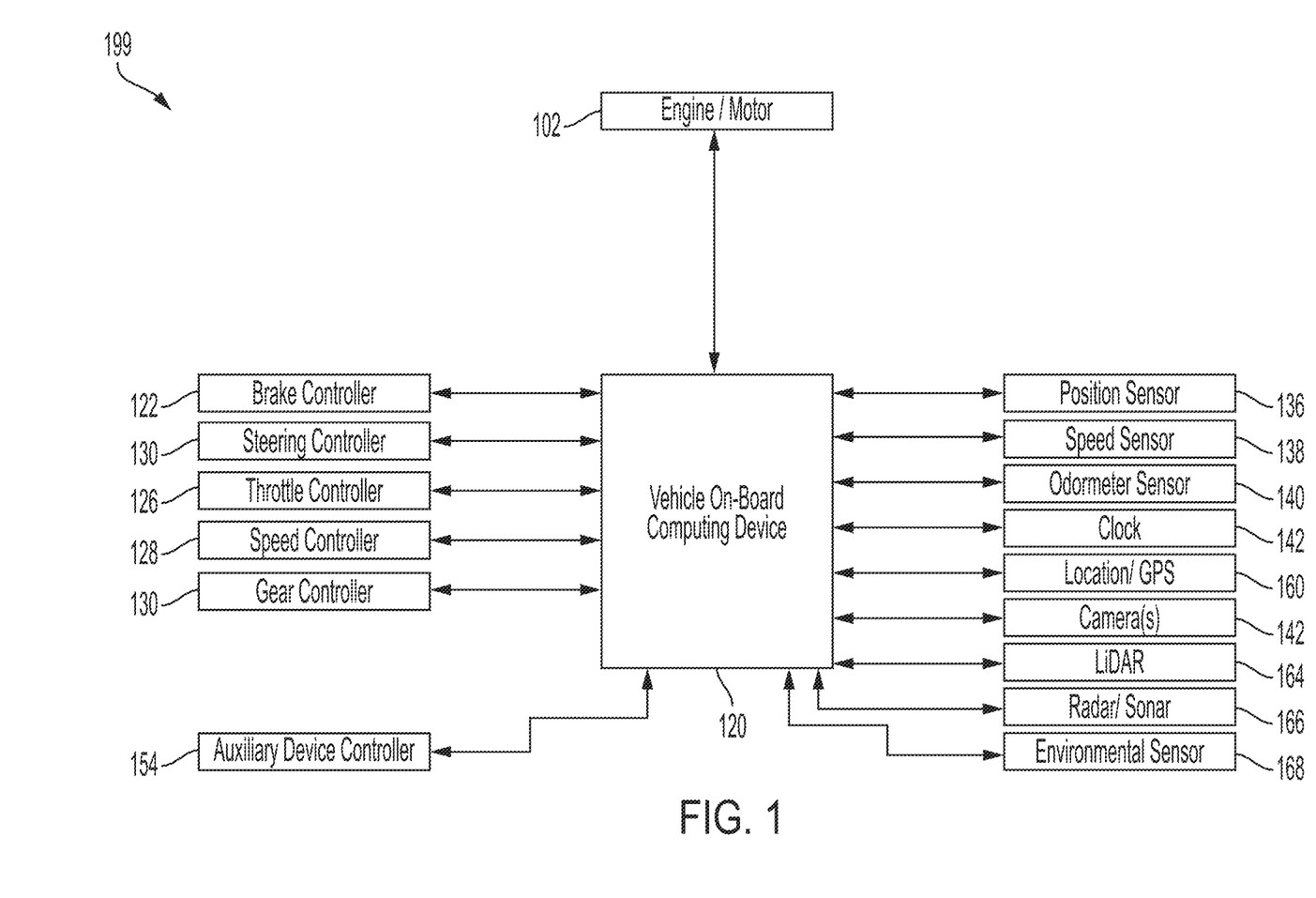
FIG. 1 illustrates example systems and components of an autonomous vehicle.

FIG. 1 illustrates an example system architecture 100 for a vehicle, such as an AV. The vehicle includes an engine or motor 102 and various sensors for measuring various parameters of the vehicle and/or its environment. Operational parameter sensors that are common to both types of vehicles include, for example: a position sensor 136 such as an accelerometer, gyroscope and/or inertial measurement unit; a speed sensor 138; and an odometer sensor 140. The vehicle also may have a clock 142 that the system uses to determine vehicle time during operation. The clock 142 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 160 such as a global positioning system (GPS) device; object detection sensors such as one or more cameras 162; a LiDAR sensor system 164; and/or a radar and or and/or a sonar system 166. The sensors also may include environmental sensors 168 such as a precipitation sensor and/or ambient temperature sensor. The object detection sensors may enable the vehicle to detect objects that are within a given distance range of the vehicle 100 in any direction, while the environmental sensors collect data about environmental conditions within the vehicle's area of travel.

During operations, information is communicated from the sensors to an on-board computing device 120. The on-board computing device 120 analyzes the data captured by the sensors and optionally controls operations of the vehicle based on results of the analysis. For example, the on-board computing device 120 may control braking via a brake controller 122; direction via a steering controller 124; speed and acceleration via a throttle controller 126 (in a gas-powered vehicle) or a motor speed controller 128 (such as a current level controller in an electric vehicle); a differential gear controller 130 (in vehicles with transmissions); and/or other controllers.

Geographic location information may be communicated from the location sensor 160 to the on-board computing device 120, which may then access a map of the environment that corresponds to the location information to determine known fixed features of the environment such as streets, buildings, stop signs and/or stop/go signals. Captured images from the cameras 162 and/or object detection information captured from sensors such as a LiDAR system 164 is communicated from those sensors) to the on-board computing device 120. The object detection information and/or captured images may be processed by the on-board computing device 120 to detect objects in proximity to the vehicle 100. In addition or alternatively, the AV may transmit any of the data to an external server for processing. Any known or to be known technique for making an object detection based on sensor data and/or captured images can be used in the embodiments disclosed in this document In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision making and or operational control may be handled in full or in part by other computing devices that are in electronic communication with the vehicle's on-board computing device. Examples of such other computing devices include an electronic device (such as a smartphone) associated with a person who is riding in the vehicle, as well as a remote server that is in electronic communication with the vehicle via a wireless communication network. The processor of any such device may perform the operations that will be discussed below.

Figure 2:
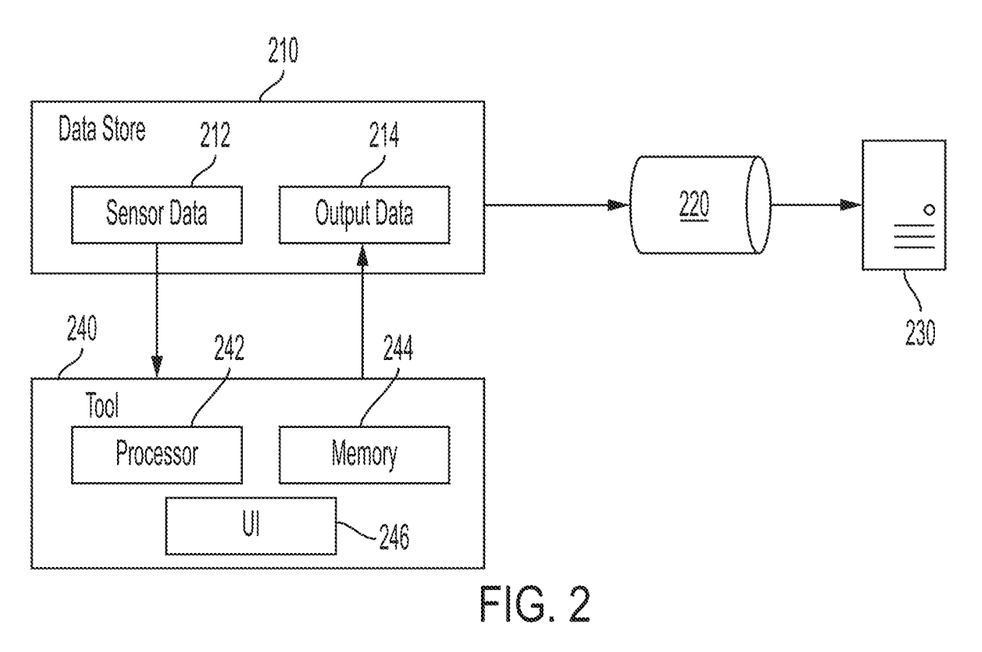
FIG. 2 illustrates an example data flow diagram for labeling of sensor data.

FIG. 2 illustrates an example data flow diagram for labeling of sensor data to generate training data for use by a robotic device (e.g., autonomous vehicle). As depicted in FIG. 2, sensor data 212 that is to be processed to generate training data 220 for the robotic device 230 is stored in a data store(s) 210. In some embodiments, the data store 210 may be a memory device on an autonomous vehicle, or an external memory device that is in electronic communication with one or more of the vehicle's on-board processors.

The sensor data 212 may include image data including 2D images (e.g., RGB camera images, thermal images, etc. that have been generated by one or more cameras) and/or may include 3D images (e.g., point clouds that have been generated by one or more LIDARs or other 3D imaging systems). In an embodiment, the 2D images and the 3D images of an environment may have been captured at the same time or at a similar time, and/or the 2D images and the 3D images may be otherwise temporally correlated to each other. In some embodiments, the image data may include multiple image frames of a 2D video and/or of a 3D video of an environment.

In some embodiments, the sensor data 212 comprising image data may be collected by an AV or other vehicle that is equipped with image sensors such as one or more cameras, one or more LIDARs, and/or other sensors that will capture digital 2D images (e.g., using cameras) and/or 3D images (i.e., point cloud data captured by LIDARs) of an environment as the vehicle moves about the environment. Optionally, multiple image sensor-equipped vehicles may capture the sensor data. In some embodiments, the vehicle's image sensors or another processor that is on the vehicle or on a remote server that receives the sensors from the vehicle will associate a location and a pose of the vehicle with each of the digital 2D and 3D images. The location and pose for each digital image represent a position (geographic location, and orientation) of the vehicle when the digital image was captured. The system may receive the location and pose information from any appropriate data source, such as the vehicle's GPS and position sensors (see FIG. 1). The sensor data 212 may, therefore, include 2D and/or 3D digital images, along with metadata including associated locations and poses. Other metadata such as time of capture, type and properties of the sensor used to capture the image, types and properties of the vehicles, or the like may also be associated with the 2D and/or 3D digital images. Other 3D data sets may also be used, such as 3D data captured by stereo cameras, data generated by analysis of 2D images by 3D model generation methods such as structure from motion (SfM) image processing, or other 3D data sets.

The sensor data 212 may be processed by a tool 240 that utilizes systems, methods, and/or techniques disclosed in this disclosure to generate labeled training data 220 for training one or more machine-learning models. The machine-learning models, as discussed above, may be used to autonomously control and/or operate robotic devices such as autonomous vehicles. In some embodiments, the tool 240 decomposes the problem of labeling a 3D image into one or more steps in a 2D environment, and supports presentation and labeling of a 3D image in a 2D display.

The tool 240 may be implemented as one or more computing devices, including a processor 242, non-transitory memory 244, a user interfaces 246 (e.g., a graphical user interface (GUI)), and other now or hereafter known components required for labeling of data. While FIG. 2 shows that the tool 240 includes the processor 242, non-transitory memory 244, and user interface 246, the disclosure is not so limiting, and one or more of these components may be remotely located from the tool 240. The user interface(s) 246 may be configured to aid a user in identifying and/or labeling particular objects depicted within the sensor data 212, as described below.

The output data 214 from the tool 240 may include identified and labeled objects that are depicted within the source data 212 (e.g., LIDAR point clouds), and may be stored in the data store(s) 210. In some embodiments, the output data 214 may include processed image data where each image or point cloud image frame may include a respective source image comprising the identifications and labels of particular objects in the image. Alternatively and/or additionally, the output data 214 may include indications of the associations between respective identified object/label pairs (e.g., as a relational database). The disclosure is not so limiting and the output data may include labeled and identified objects in any other suitable format. While the output data 214 is shown as being stored in the data storage entity 210 along with the sensor data 212, this is not limiting, and the output data 214 may be additionally or alternatively be stored as desired in one or more other separate and distinct data storage entities (not shown).

One or more portions of the output data 214 may be incorporated into or included in the training data set 220 for training one or more machine-learning models, which may be utilized by a robotic device 230 for control and operation (e.g., control and operation of an autonomous vehicle during navigation).

It is understood that the data flow diagram 200 and the components illustrated in FIG. 2 is only one of many possible embodiments. For example, the tool 240 may be implemented by a network of multiple computing devices, and/or by a cloud computing system (for example, multiple users collaborating to label a set of sensor data). In some embodiments, at least one of the user interfaces 246 may be implemented at a computing device that is remote from processor 242 and/or memory 244, such as when the user interface 246 is implemented on a client device while the processor 242 and/or memory 244 are implemented at one or more servers or back-end computing devices (for example, in a web service or other type of client/server application). In some embodiments, the processor 242, the memory 246, and/or the user interface 246 are implemented in a distributed manner. For example, a remote client device may include a first portion of processor memory, and/or computing instructions, and one or more servers or back-end computing devices communicatively connected to the remote client device may include a second portion of processor memory, and/or computing instructions. For ease of reading, one or more processors, one or more memories, and one or more user interfaces are referred to using the singular tense; however it is understood that this is for ease of reading purposes only, and is not limiting.

Figure 3:
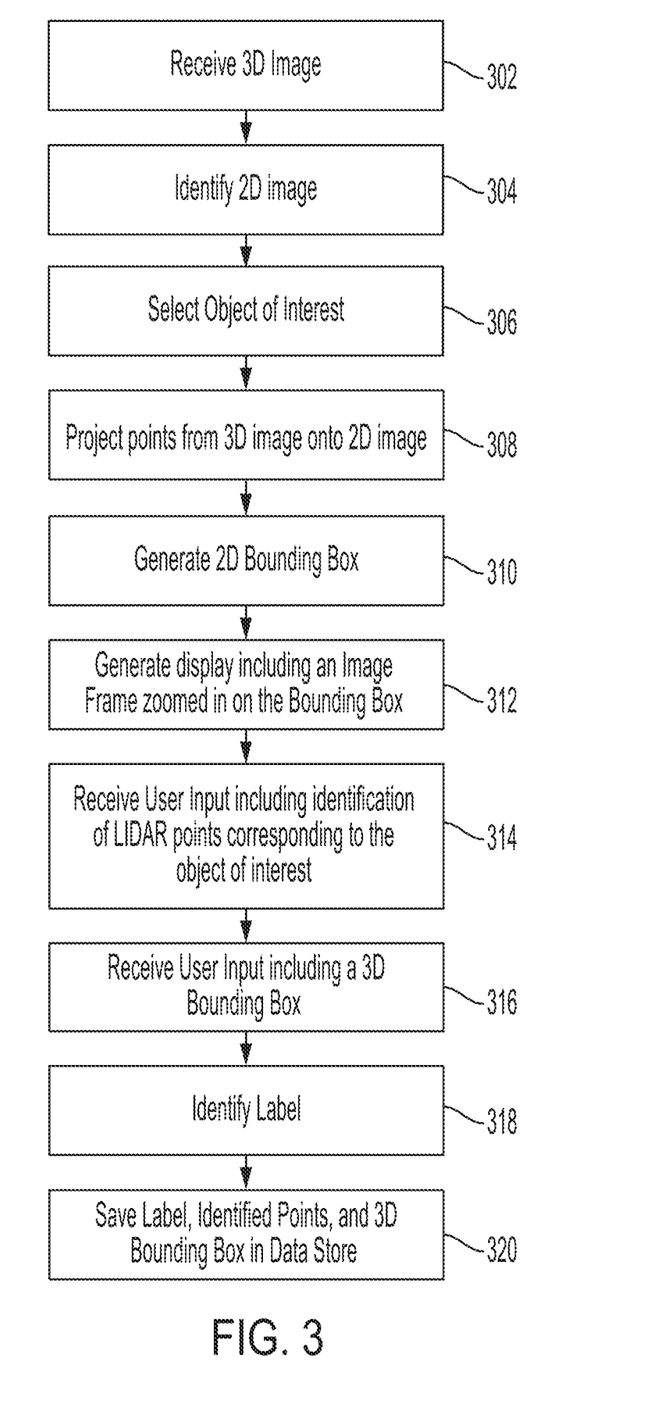
FIG. 3 is a flow diagram illustrating a method of for object identification and labeling of sensor data.

FIG. 3 is a flow diagram illustrating various steps of a process for object identification and labeling of sensor data. It will be understood that while FIG. 3 and related description describes labeling of point cloud data obtained from a LIDAR sensor, the systems and methods of this disclosure may be used for labeling other types of 3D sensor data without deviating from the principles of this disclosure.

Figure 4A:
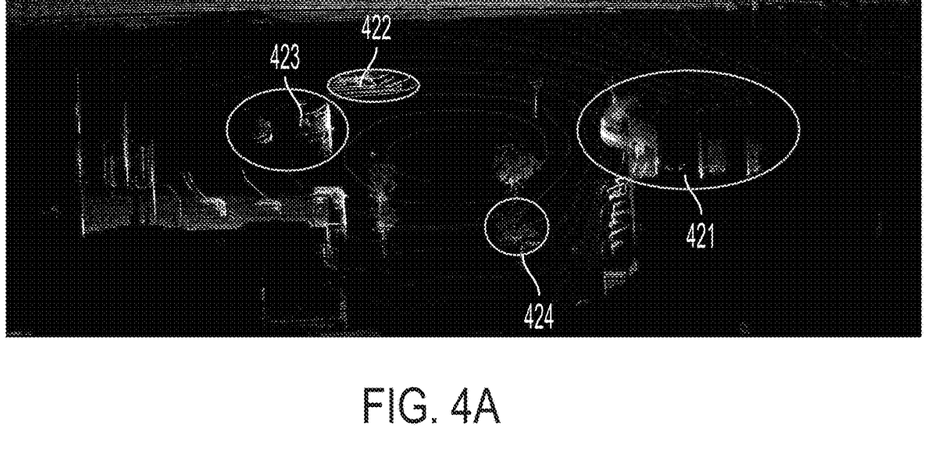
FIG. 4A illustrates an example 3D image of a scene.

At 302, the system may receive a 3D image that includes a to-be-labeled point cloud image frame of a scene captured using a LIDAR sensor. As used herein, a 3D image refers to a set of LIDAR sensor data accumulated in certain duration of time (e.g., 0.1 second). As such, although point cloud data is collected continuously, 3D images of LIDAR scanning points may be generated at discrete time intervals. FIG. 4A illustrates an example 3D image 410 of a scene that includes LIDAR scan points associated with one or more objects 411, 412, 413, and 414 (included in the corresponding ovals).

The system may identify 304 a reference 2D image captured using a camera and that is associated with the 3D image. A 2D image may be associated with a 3D image if the 3D image includes an image of the scene depicted in the 2D image, and was captured within a threshold time of capturing the 2D image (e.g., simultaneously and/or within a few hundred milliseconds). In an embodiments, the 2D image may be a camera image formed by photographing an identical scene at an identical moment as the 3D image. For example, each of the 3D image and the 2D images may have a respective timestamp indicative of its time of capture, and the two timestamps may differ by only a short time interval (e.g., within a time interval of a half a second, within a time interval of one second, etc.). Optionally, the system may identify, from the 2D images in the data store, a set of digital images that are associated with the pose and the location corresponding to the 3D image. The system may generate the reference 2D image from the identified set of digital images by, for example, normalization. The system may do this using known processes such as auto white balance, auto brightness/contrast, and other correction methods.

Figure 4B:
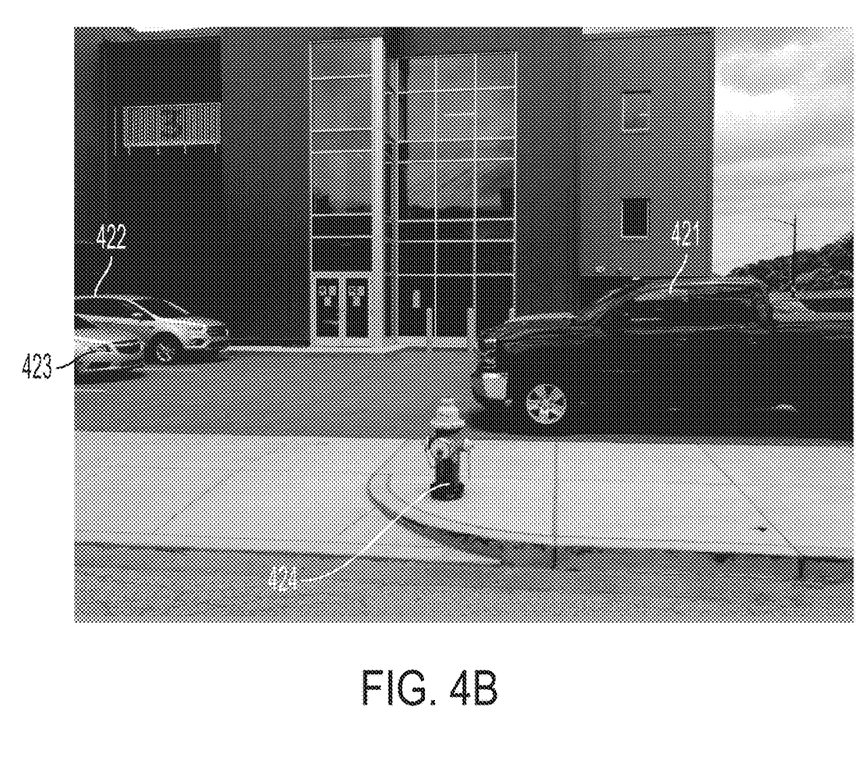
FIG. 4B illustrates a corresponding 2D image.

FIG. 4B illustrates a reference 2D image 420 associated with the 3D image shown in FIG. 4A, and is shown to include the corresponding objects 421, 422, 423, and 424.

As discussed above, the received 2D and 3D images may include and/or may be associated with metadata such as without limitation, location, pose, time of capture, types and properties of the sensors used to capture the images, environmental conditions, or the like.

At 306, the system may select an object of interest in the reference 2D image, where the object of interest will be identified and labeled in the 3D image using the methods described below. Optionally, the system may receive a selection of an object of interest from a user (e.g., in response to an operation by the user of selecting an object in the reference 2D image using a user interface). For example, the system may select and/or receive a selection of an object of interest 421 (i.e., the car) in the 2D image 420 shown in FIG. 4B. Optionally, the system may select the object of interest automatically using any now or hereafter known object detection algorithms.

Examples of an "object of interest" may include, without limitation, components of a building (e.g., doors, windows, walls, roofing, stairs, plumbing/piping, electrical equipment, flooring material, decorative aspects), landscape components (e.g., trees, shrubs, driveways, water features), vehicles, people, animals and the like. The systems and methods of this disclosure may be used to identify and label more than one object of interest in a scene, such as a collection of smaller objects (e.g., doors, windows, etc.) associated with a larger object (e.g., the overall dimensions of a building) where information about such collection of smaller and larger objects can be processed and, in some aspects, the one or more objects can be identified from the scene. As such, an object of interest can include a collection of one or more smaller objects (e.g., doors, windows, etc.) associated with a larger object (e.g., a building). It should be understood that in some instances, an object of interest may be present or partially present in a scene, and in others, there may be more than one object of interest in the scene. Partially ("or at least part of") in reference to an object of interest refers to an instance where only a portion or portions but not the whole of an object is visible in the scene. In some aspects, the present methods can be utilized to generate information about single or multiple objects of interest that may be present or partially present in a scene, as desired by a user. An example of partial presence of an object in a scene can include instances where the object is only partially captured due to occlusion or the perspective of the capture device or where parts of the object fit into the scene but the entirety of the object does not.

The system may project (308) the points in the 3D image (i.e., 3D point cloud points) on to the reference 2D image, to obtain one or more projected 2D image frames along different directions of projection (i.e., different views). Such projection may include projecting or mapping each 3D image point in the 3D image to a pixel in the 2D image. In some embodiments, the system may project the complete 3D image on to the reference 2D image. Alternatively, the system may project an area of the 3D image that includes at least the object of interest on the reference 2D image. As such, rather than projecting all 3D image points to every available pixel in a 2D reference image, the system may first filter out pixels that are not pixels showing an image of the object of interest.

In some embodiments, the system perform the projection using any now or hereafter known methods such as, without limitation, using a defined coordinate mapping function between the 3D image and the 2D image to obtain the projected points. The coordinate mapping function may be any mapping relation from three-dimensional coordinates to two-dimensional coordinates/pixels (e.g., a linear transformation using a transformation matrix that warps points through multiplication from one vector space to another vector space), and may be determined according to parameters (e.g., calibration, pose, orientation, image frame of reference etc.) of a LIDAR sensor used for collecting the 3D image data and parameters of a camera for taking the 2D image (e.g., camera matrix, calibration, pose, orientation, image frame of reference etc.), and/or may be calculated in advance according to defined point cloud data and coordinates of a corresponding object in the camera image. In some embodiments, the coordinate mapping function may also compensate for the motion of a vehicle (on which the LIDAR and/or the camera are mounted for collection of the 3D and 2D images) between the time the 2D image is recorded and the time the LIDAR sweep corresponding to the 3D image is recorded.

Figure 5:
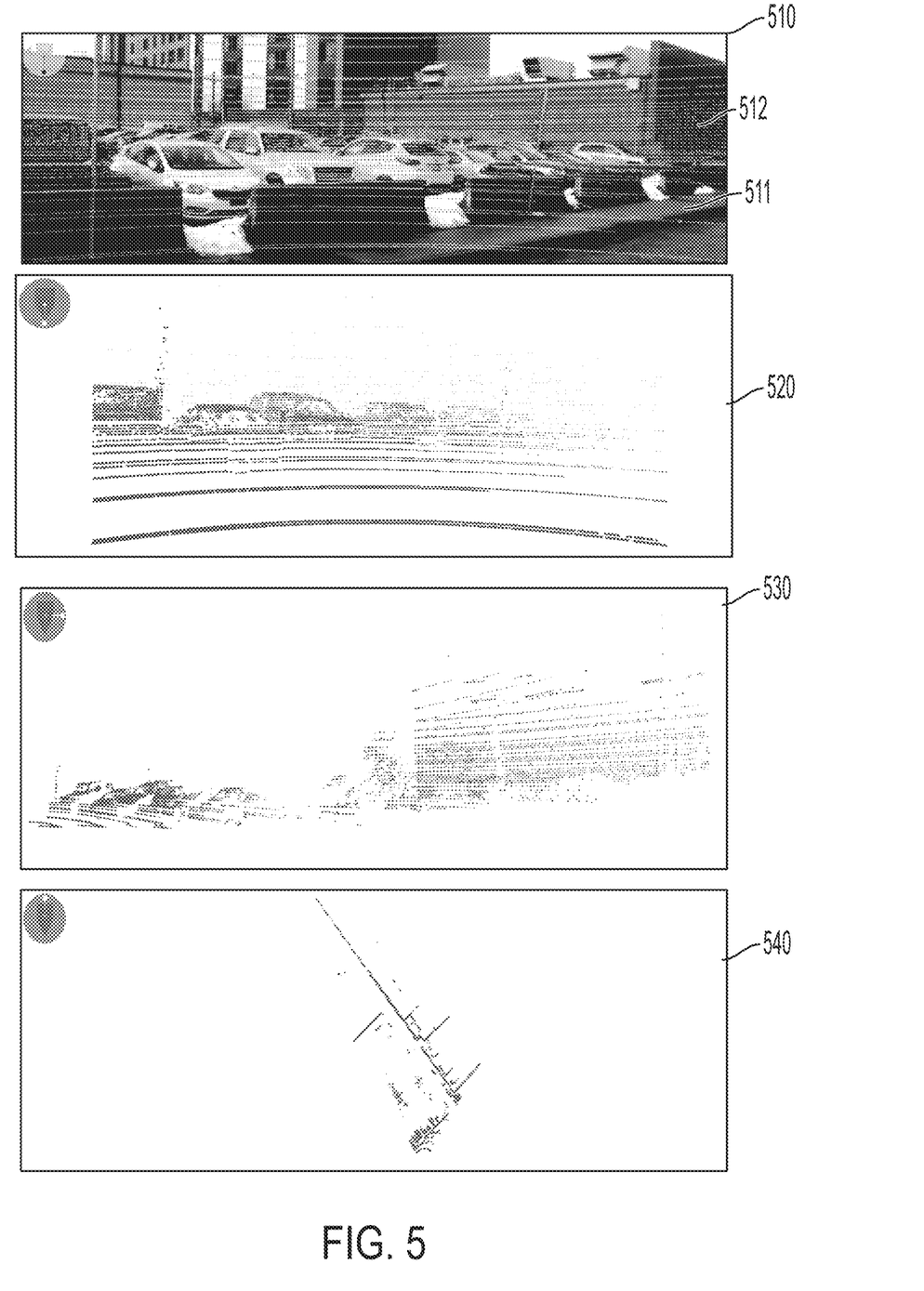
FIG. 5 illustrates an example display interface that displays one or more projected image frames generated by projecting a LIDAR point cloud in different directions.

Referring now to FIG. 5, it illustrates an example display interface 500 that displays one or more projected image frames generated by projecting a 3D image onto a 2D image in different directions. Optionally, the display interface 500 may be a graphical user interface used by a user for identification and labeling of the object of interest in the 3D image. For example, FIG. 5 illustrates three projected image frames 520, 530, 540 generated using projection of the 3D image on the reference 2D image in the forward LIDAR view direction (as viewed by a camera/bystander situated in front of the object—shown by the direction in the upper left corner of 520), transverse LIDAR view direction (as viewed by a camera/bystander situated in diagonally in front and to one side of the object—shown by the direction in the upper left corner of 530), and top-down LIDAR view direction (as viewed by a camera (e.g., in a drone) situated in front and above the object—shown by the direction in the upper left corner of 540), respectively. The directions here are based on the camera image frame and the LIDAR image frame, where the camera image frame is placed in the center of the camera lens (i.e., the x-axis points down the lens barrel out of the lens, the z-axis points up, the y/z plane is parallel to the camera plane, and the coordinate system is right handed) and the LIDAR sensor image frame has the z-axis pointing upward with the x/y plane depending on the LIDAR position. Other projected image frames in different directions are within the scope of this disclosure and may be presented in addition to and/or as alternatives to the projected image frames shown in FIG. 5.

The display interface 500 may also include an image frame 510 that includes a projected image frame 512 superimposed on top of the reference 2D image 511, and illustrates both the 2D image as well as the projected LIDAR point cloud in the projected image frame. FIG. 5 illustrates the projected image frame generated in the forward LIDAR view direction (i.e., image frame 520) as being superimposed on the 2D image. It should be noted that while FIG. 5 shows the projected image frame generated in the forward LIDAR view direction as being superimposed on the 2D image, other projected image frames may also be superimposed on the reference 2D image. The system may select one or more projected image frames for superimposition on the reference 2D image depending upon the size, location, configuration, etc. of the object of interest. In certain embodiments, for example, when the object is small and stationary (e.g., a traffic signal), a single frame of a LIDAR point cloud may not contain many points corresponding to the object. In these scenarios, the system may accumulate LIDAR point clouds taken up to several seconds before and after the time of capture of the 2D image. These additional 3D images can be simultaneously projected onto the reference 2D image so that there are more LIDAR points corresponding to the object of interest.

At 310, in the system may generate a 2D bounding box that envelops the object of interest in the reference 2D image. The system may generate the 2D bounding box in the image frame that includes a projected image frame superimposed on top of the reference 2D image (for example, image frame 510 of FIG. 5). It should be noted that the 2D bounding box may be any two dimensional outline or bounding area that fully envelopes the object of interest such as, for example, a rectangular outline, a square outline, a circular outline, an oval outline, an outline that mimics the shape of the object of interest, or any other possible shape. The 2D bounding box may include a specified distance between the object of interest and the outline. The specified distance may be selected, for example, as a threshold beyond which other objects may get included into the 2D bounding box, the shape of the 2D bounding box, shape and size of the object of interest, or the like.

Figure 6:
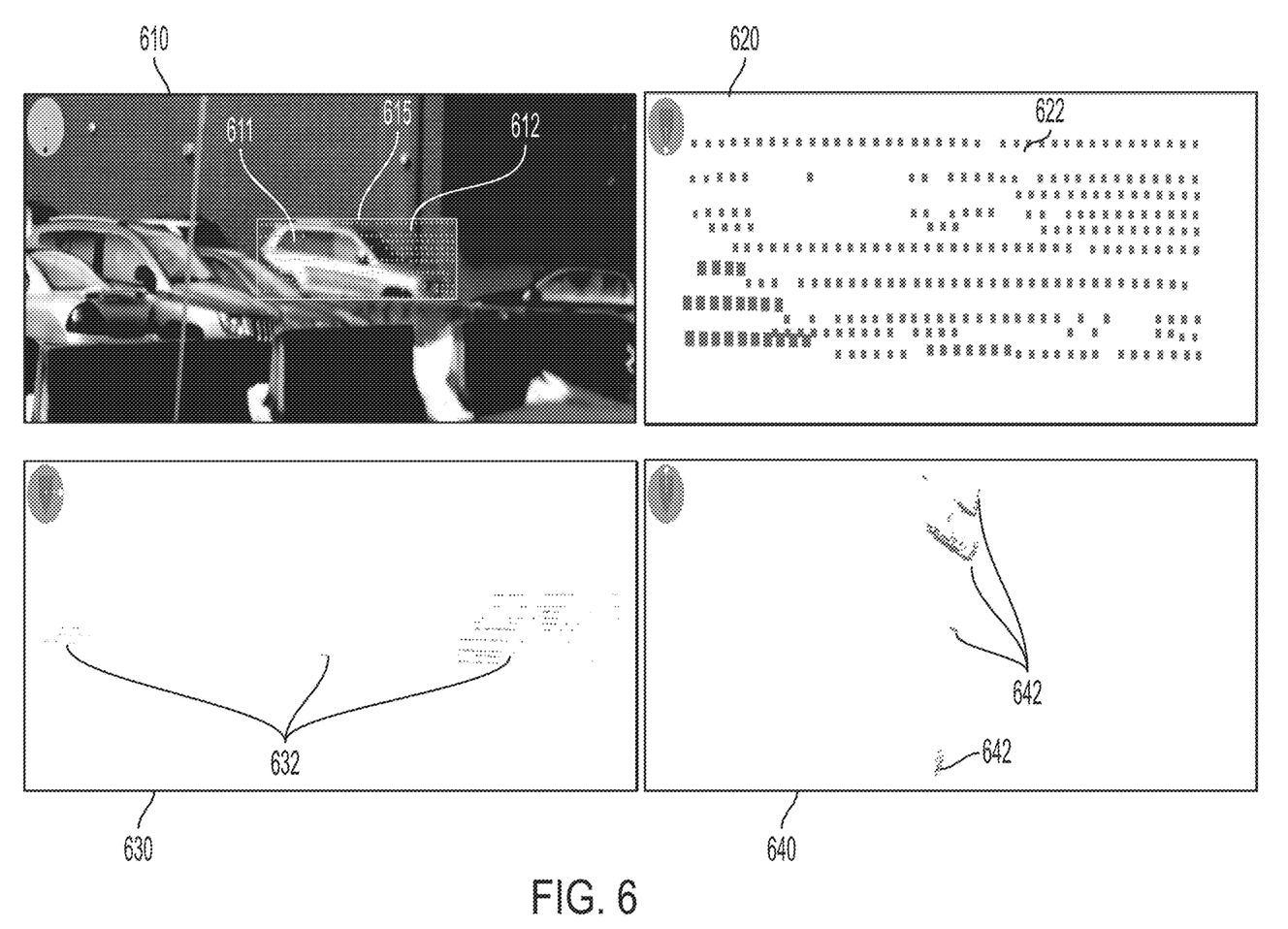
FIG. 6 illustrates the display interface of FIG. 5 that includes the image frames of FIG. 5 zoomed in on an object of interest.

At 312, the system may generate a display interface that includes one or more image frames zoomed in on the bounding box and/or area corresponding to the bounding box. The generated bounding box may be displayed in the image frame that includes the 2D reference image. For example, the generated display interface may include an image frame with the projected image frame superimposed on top of the reference 2D image and the generated 2D bounding box, and various other projected image frames, all of which are zoomed in to the generated 2D bounding box and/or an area corresponding to the bounding box. FIG. 6 illustrates a display 600 that includes the image frames generated in FIG. 5 that are zoomed into the generated 2D bounding box and/or an area corresponding to the bounding box. Specifically, image frame 610 (corresponding to image frame 510 of FIG. 5) includes a 2D bounding box 615 that envelopes the 2D image of the object of interest 611, and that is zoomed in on the 2D bounding box 615. As shown in image frame 610 of FIG. 6, the 2D bounding box 615 includes the object of interest in the 2D reference image 611, and the projected LIDAR points 612 (i.e., a subset of the LIDAR point cloud shown in FIG. 510 that fall within the 2D bounding box). It should be noted that the LIDAR points 612 may not necessarily be associated with the object of interest, as described below. Furthermore, the system may update the projected image frames 510, 520, 530, and 540 to only show the respective projected LIDAR points (shown as 622, 632, and 642, respectively) that correspond to the LIDAR points 612 and/or the area of 2D bounding box to generate image frame 620, 630, and 640 shown in FIG. 6. The system may identify the points to be included in the image frames 620, 630, and 640 based on the coordinate mapping function between the 3D image and the 2D image.

The level of zoom may be determined based on, for example, the size of the object of interest, resolution of the 2D reference image, size of the reference 2D image, and the size of the 2D bounding box relative to the size of the reference 2D image.

At 314, the system may receive a first user input that includes an identification of the projected LIDAR points in one or more of the displayed image frames that correspond to and/or are associated with the object of interest, and update the remaining image frames to reflect the received input. For example, the display shown in FIG. 6 may allow a user to highlight, color (different colors, grayscale, etc.), or otherwise select one or more LIDAR points in any of the image frames 610, 620, 630, and 640 that are associated with (and/or not associated with) the object of interest 611. It should be noted that since the image frames are synchronized (i.e., created using the same coordinate mapping function), any user action with respect to projected LIDAR points in one image frame is automatically reflected in the other image frames. As such, the user is able to simultaneously view the particular object from three different perspectives (in addition to the bounding box view include the 2D reference image view) and identify the LIDAR point in any of the four image frames to better refine the identification accuracy. Such simultaneous, synchronous display of the different image frames allows a user to clearly and accurately discern, distinguish and/or identify the 3D LIDAR points associated with the object of interest while viewing them in an easy to visualize 2D format.

Figure 7:
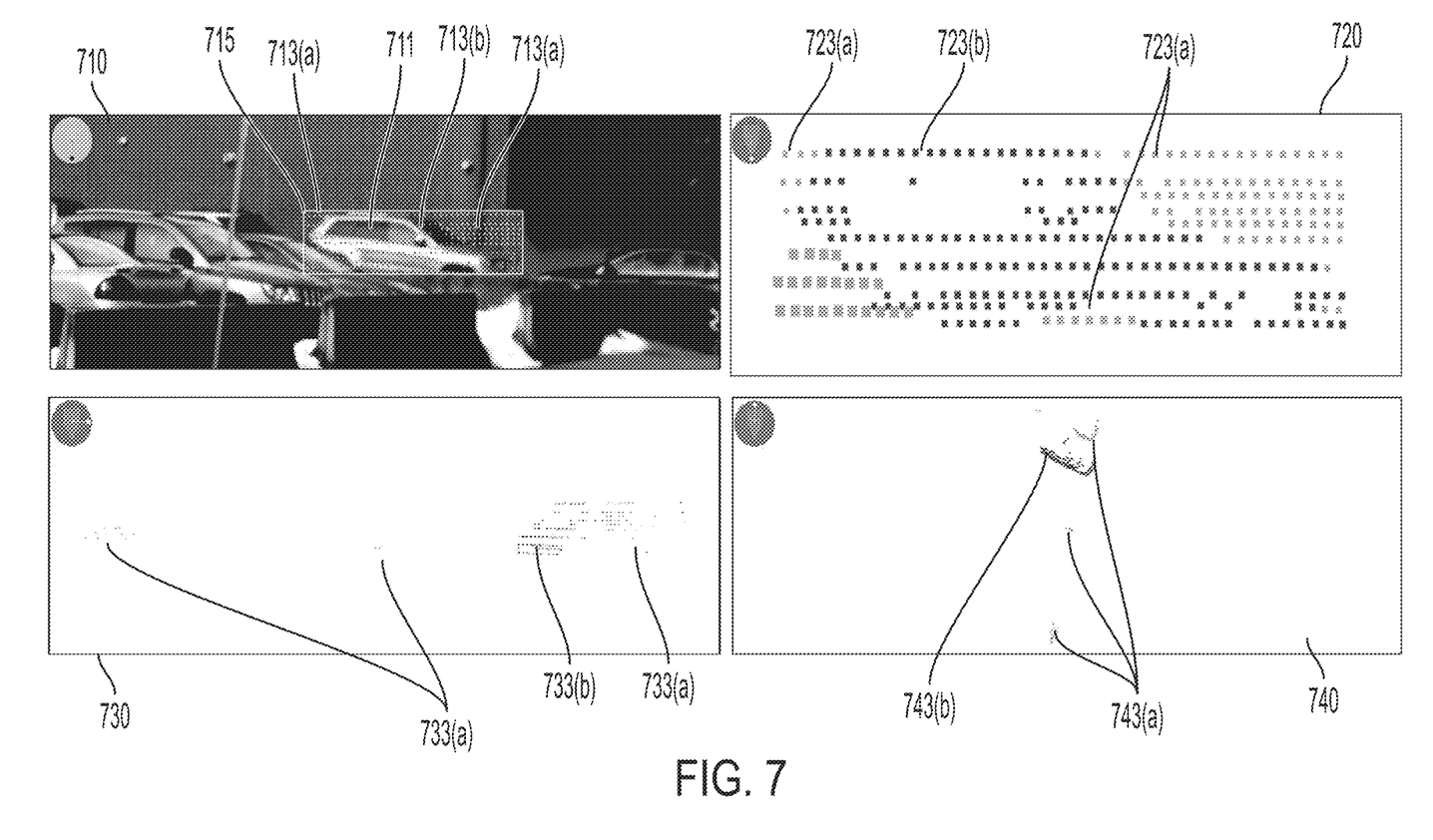
FIG. 7 illustrates the display interface of FIG. 6 that includes various user actions for identification of LIDAR points associated with the object of interest.

For example, FIG. 7 illustrates image frames 710, 720, 730, and 740 that correspond to 610, 620, 630, and 640 to FIG. 6, and include the received user input. As shown in image frame 710, a user may highlight the points that he/she discerns to not be associated with the object of interest 711 in the bounding box 715 by coloring them in a different color (e.g., points 713(*a*) in a lighter gray color/shade associated with point reflected from the wall, terrain or grass surrounding the vehicle) than the points associated with the object of interest 711 (e.g., points 713(*b*) in a darker gray color/shade). Since any user actions with respect to the LIDAR points in any of the image frames 710, 720, 730, and 740, are automatically reflected in the remaining image frames, the system may automatically apply the user's selection to the other image frames as shown by the points 723(*a*), 733(*a*), and 743(*a*) shown in a lighter gray color in image frames 720, 730, and 740, respectively, as not being associated with the object of interest. Similarly, the system may automatically apply the user's selection to the other image frames as shown by the points 723(*b*), 733(*b*), and 743(*b*) shown in a darker gray color in image frames 720, 730, and 740, respectively, as being associated with the object of interest. (The colors used in FIG. 7 and the other figures in this disclosure are by way of example only; other colors may be used in practice.)

Figure 8:
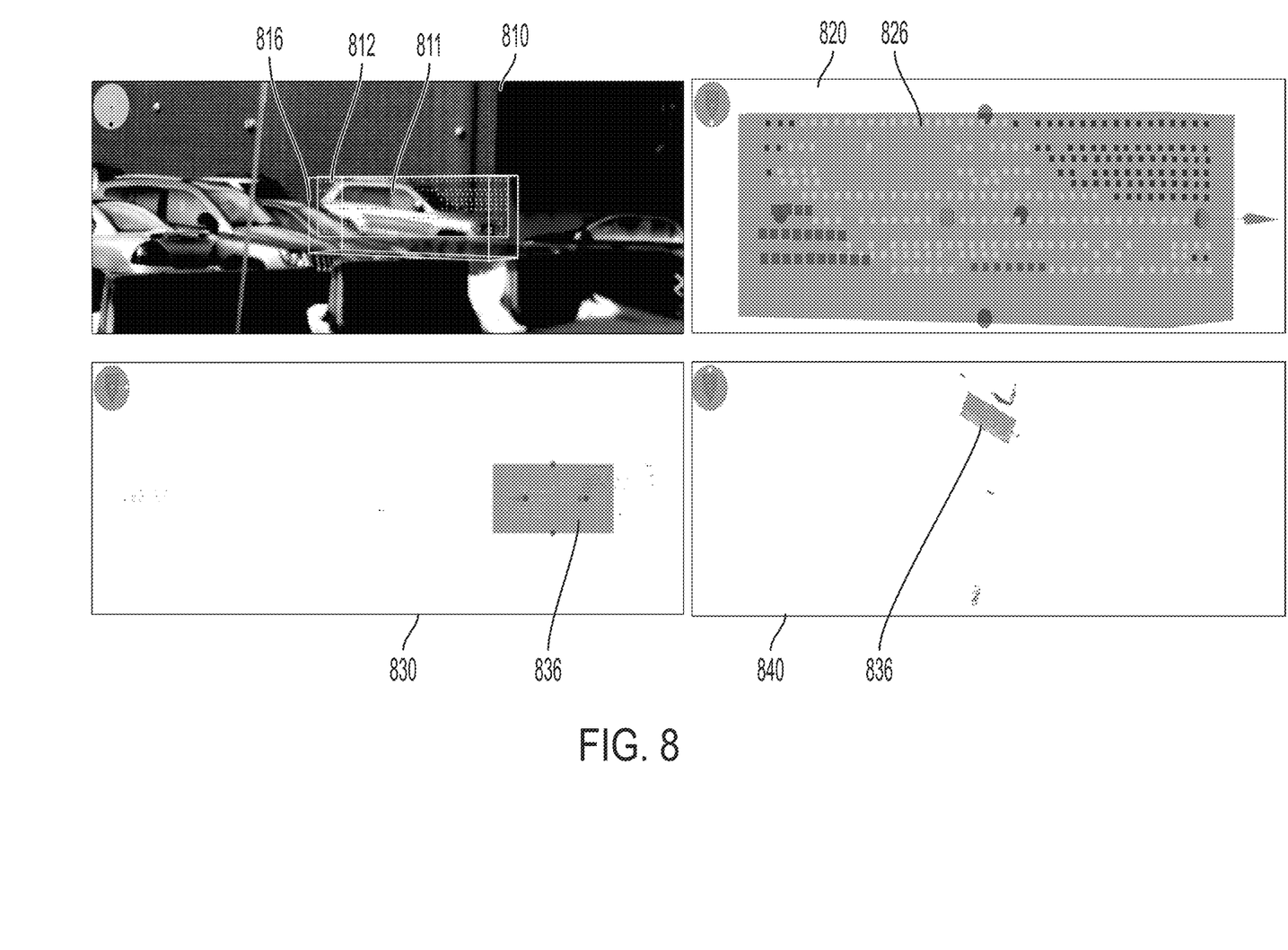
FIG. 8 illustrates the display interface of FIG. 7 that includes a 3D bounding box encompassing the identified LIDAR points.

Upon identification of the LIDAR points associated with the object of interest, the system may receive a second user input (316) that includes a 3D bounding box (e.g., a cuboid, a cubic, a prism, etc.) that bounds or envelops the identified LIDAR points. For example, the system may allow a user to draw a 3D bounding box (using any now or hereafter known user interface drawing tools) around the LIDAR points associated with the object interest in each of the image frames 710, 720, 730, and 740 shown in the FIG. 7. The system may also allow a user to manipulate the image frames, such as by zooming in, zooming out, or translating, to aid the user in bounding the identified LIDAR points. In some embodiments, the system may automatically generate a 3D bounding box enveloping the identified LIDAR points that may, optionally, be manipulated by a user for accuracy or fine tuning. For example, a 3D bounding box (a cuboid) 816 drawn using the image frames shown in FIG. 7 is illustrated in FIG. 8.

Furthermore, the system may automatically detect changes in the shape, size, and/or orientation of the 3D bounding box in one of the image frames, and make corresponding changes in the other image frames. This allows a user to adjust the dimensions, location and/or orientation of the 3D bounding box based on the information visible in one or more of the image frames, as well as the 2D reference image, even if the LIDAR point cloud is incomplete (for example, when one or more surfaces of the object of interest do not reflect back LIDAR points). For example, in the example shown in FIGS. 4-7, the front and passenger sides of the parked car (i.e., the object of interest) don't have any reflected LIDAR points because the LIDAR sensor is facing the driver side and slightly behind it during the LIDAR scan). The methods and systems of the current disclosure allow a user to adjust the dimensions of the 3D bounding box by manipulating the/drawing the bounding box in image frame 810 based on the estimated size of the parked car from the 2D image, which is automatically reflected in the other image frames 820, 830, and 840 that may be missing LIDAR points. As shown in FIG. 8, the 3D bounding box 816 in image frame 810 is drawn to fit inside the 2D bounding box 812 such that it corresponds closely with the dimensions of the object of interest 811. This obviates the need for a complete set of LIDAR points for generating the 3D bounding box. The dimensions of the 3D bounding box 816 drawn in image frame 810 is reflected in the bounding boxes 826, 836, and 846 of the other projected image frames 820, 830, and 840.

The 3D bounding box may provide information about spatial location, orientation, as well as size for the object it contains. The 3D bounding box may provide information about spatial location, orientation, as well as size for the object it contains.

At 318, the system may assign a label to the identified LIDAR points and the 3D bounding box. Typically, the label is one of a plurality of categories and/or classifications which a machine learning model may utilize to learn what types of groupings of data points represent different categories/classifications. An example set of labels includes "car", "large vehicle", "pedestrian", "cyclist", "motorcyclist", "traffic sign", "road", "traffic light", etc. Examples of labels that are more granular include "bus", "semi-trailer truck", "animal", "ice patch", "pothole", etc. In some embodiments, the label may be the label identified for the object of interest in the reference 2D image. For example, the system may perform object identification and compute labels for one or more objects in the reference 2D image using any now or hereafter known object recognition methods (e.g., using machine learning models trained to identify and label objects in a 2D image, using object libraries). In some embodiments, the labels may be presented to a user for verification using, for example, a display including the 2D image and labels associated with one or more objects in the 2D image. Alternatively and/or additionally, a user may assign a label with the object of interest. In an embodiment, the user may use a drop-down menu to select one of the labels displayed in the drop-down menu to be associated with the 3D bounding box. In another embodiment, the user may enter free-form text to generate a new label for a category or classification of the object that is identified or distinguished by the 3D bounding box. The labeling may be semantic and may be used by machine learning models to understand the nature of the labeled object in the world or the environment.

The system may then store (320) the LIDAR points and the 3D bounding box in association with the label to a data store for training of a machine learning model (described above with respect to FIG. 2), and/or use in control and operation of a robotic device (e.g., an autonomous vehicle).

While not shown here, the various displays and user interfaces discussed above may include a number of selectable user controls that respectively correspond to a number of features via which the user may discern, distinguish, and/or identify objects and associated LIDAR points, and perform one or more of the user functions described above (e.g., draw a 3D bounding box). It will be understood to those of skill in the art that the arrangements and numbers of image frames shown in the figures of this disclosure are by way of example only; other arrangements/numbers may be used in practice.

Figure 9:
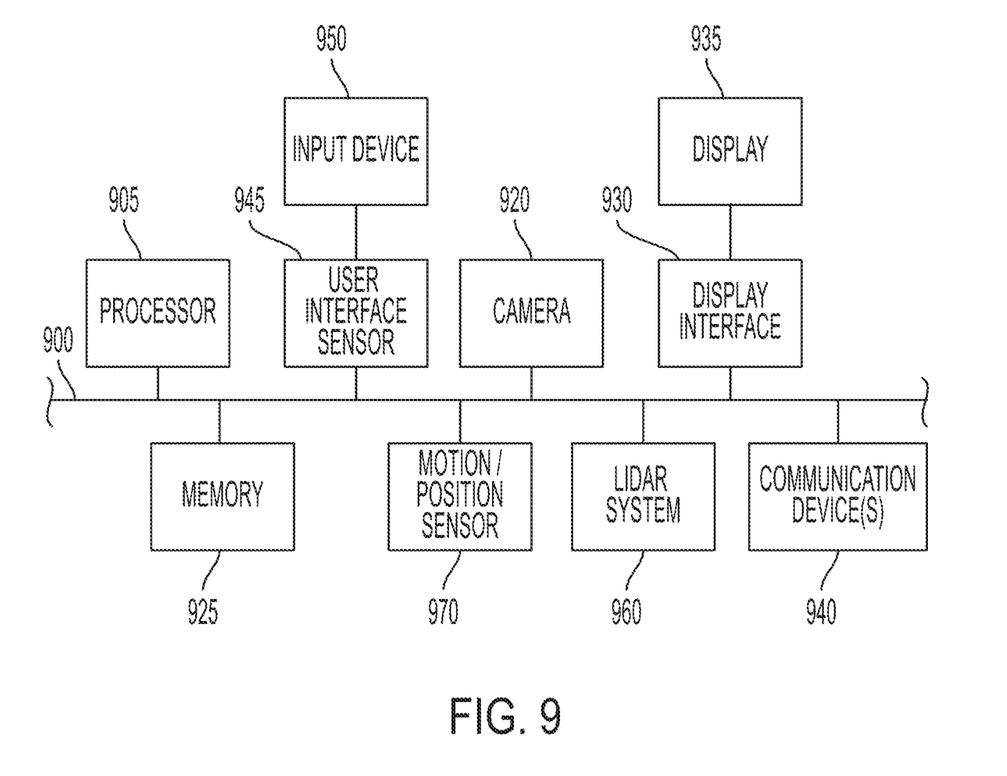
FIG. 9 is a block diagram that illustrates various elements of a possible electronic subsystem of a vehicle and/or external electronic device.

FIG. 9 depicts an example of internal hardware that may be included in any of the electronic components of the system, such as internal processing systems of the vehicle, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 930 may permit information from the bus 900 to be displayed on a display device 935 in visual, graphic or alphanumeric format, such on an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital images also may be received from a camera 920 that can capture video and/or still images. The system also may receive data from a motion and/or position sensor 970 such as an accelerometer, gyroscope or inertial measurement unit. The system also may receive data from a LiDAR system 960 such as that described earlier in this document.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other systems.

In this document, the term "mounted" may be used to refer to sensors or other components that are attached to, held within, or positioned on a vehicle.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "labeling" refers to the process of identifying different object regions in an image and giving each object region a unique labeled value.

A "scene" or an "environment" is a location that can incorporate one or more objects, one or more of which may be of interest such that the system may be configured to provide recognition, measurement, labeling, etc. for the object(s) of interest in a 3D sensor data set. For example, a scene can include one or more buildings, roads, landscape elements, vehicles, etc. In another non-limiting example, a scene can comprise a one or more objects located in the interior of a building, where the one or more objects can comprise walls, floors, mechanical equipment, windows, doors, doorways, furniture, fixtures, computers and related equipment, etc., all of which or one of which can comprise the "one or more objects of interest" in accordance with this disclosure.

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, medical-related processes, construction-related processes, and/or the like. Example automated devices may include, without limitation, autonomous vehicles, drones and other autonomous robotic devices.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated. In addition when items are described as "relatively" different to another item (such as a relatively shorter distance or relatively longer distance), the term of relativeness indicates that the items are to be compared to each other.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method for processing point cloud data, the method comprising:
   receiving a 3D image comprising point cloud data;
   displaying, on a user interface, a 2D image associated with the 3D image;
   generating a 2D bounding box that envelops an object of interest in the 2D image;
   generating an image frame for identification of one or more points in the point cloud data as being associated with the object of interest based on a user's interaction with the image frame, the generating comprising:
      generating, by projecting a plurality of points in the 3D image on the 2D image in a first direction, a first projected image frame comprising a first projected plurality of points;
      displaying, on the user interface, the image frame that comprises the 2D image and the 2D bounding box superimposed by the first projected image frame;
      receiving a first user input comprising a selection of a set of points in the first projected plurality of points that correspond to the object of interest;
   identifying a label for the object of interest; and
   storing, in a data store, the set of points that correspond to the object of interest in association with the label.

2. The method of claim 1, wherein projecting the plurality of points in the 3D image on the 2D image in a first direction comprises projecting each of the plurality of points to a pixel of the 2D image.

3. The method of claim 1, further comprising generating, by projecting the plurality of points in the 3D image on the 2D image in a second direction, a second projected image frame comprising a second projected plurality of points.

4. The method of claim 3, further comprising simultaneously displaying, on the user interface at least two of the following: the image frame, the first projected image frame, or the second projected image frame.

5. The method of claim 4, wherein receiving the first user input comprises receiving the first user input via a user interaction with at least one of the following while being displayed on the user interface: the image frame, the first projected image frame, or the second projected image frame.

6. The method of claim 5, further comprising automatically updating at least another one of the following, based on the first user input, while being simultaneously displayed on the user interface: the image frame, the first projected image frame, or the second projected image frame.

7. The method of claim 3, further comprising simultaneously displaying, on the user interface at least two of the following: the image frame zoomed in on the 2D bounding box, the first projected image frame zoomed in on the bounding box, or the second projected image frame zoomed in on the 2D bounding box.

8. The method of claim 3, further comprising identifying a 3D bounding box that envelops the set of points that correspond to the object of interest.

9. The method of claim 8, wherein identifying the 3D bounding box comprises receiving a second user input via a user interaction with at least one of the following while being displayed on the user interface: the image frame, the first projected image frame, or the second projected image frame.

10. The method of claim 9, further comprising automatically updating at least another one of the following, to display the 3D bounding box, while being simultaneously displayed on the user interface: the image frame, the first projected image frame, or the second projected image frame.

11. The method of claim 8, further comprising storing, in the data store, the 3D bounding box in association with the label.

12. The method of claim 8, wherein dimensions of the 3D bounding box are determined based on at least dimensions of the object of interest in the 2D image.

13. The method of claim 1, wherein identifying the label comprises receiving the label from a user.

14. The method of claim 1, wherein identifying the label comprises identifying the label automatically as the label associated with the object of interest in the 2D image.

15. The method of claim 1, wherein the 2D image is a camera image that includes an identical scene as the 3D image and is captured within a threshold time as the point cloud data in the 3D image.

16. The method of claim 1, wherein the point cloud data is captured using a LIDAR sensor.

17. The method of claim 1, further comprising using the stored set of points that correspond to the object of interest in association with the label for training a machine learning model, the machine learning model configured for controlling an autonomous vehicle.

18. A system for processing point cloud data, the system comprising:
   a display;
   a processor; and
   a non-transitory computer-readable medium comprising programming instructions that when executed by the processor cause the processor to:
      receive a 3D image comprising point cloud data;
      display, on the display, a 2D image associated with the 3D image;
      generate a 2D bounding box that envelops an object of interest in the 2D image;
      generate an image frame for identification of one or more points in the point cloud data as being associated with the object of interest based on a user's interaction with the image frame, the generating comprising:
         generating, by projecting a plurality of points in the 3D image on the 2D image in a first direction, a first projected image frame comprising a first projected plurality of points;
         displaying, on the display, an image frame that comprises the 2D image and the 2D bounding box superimposed by the first projected image frame;
         receiving a first user input comprising a selection of a set of points in the first projected plurality of points that correspond to the object of interest;
      identify a label for the object of interest; and
      store, in a data store, the set of points that correspond to the object of interest in association with the label.

19. The system of claim 18, wherein projecting the plurality of points in the 3D image on the 2D image in a first direction comprises projecting each of the plurality of points to a pixel of the 2D image.

20. The system of claim 18, further comprising programming instructions that when executed cause the processor to generate, by projecting the plurality of points in the 3D image on the 2D image in a second direction, a second projected image frame comprising a second projected plurality of points.

21. The system of claim 20, further comprising programming instructions that when executed cause the processor to simultaneously display at least two of the following: the image frame, the first projected image frame, or the second projected image frame.

22. The system of claim 21, wherein the programming instructions that cause the processor to receive the first user input comprise programming instructions to cause the processor to receive the first user input via a user interaction with at least one of the following while being displayed on the display: the image frame, the first projected image frame, or the second projected image frame.

23. The system of claim 22, further comprising programming instructions that when executed cause the processor to automatically update at least another one of the following, based on the first user input, while being simultaneously displayed on the display: the image frame, the first projected image frame, or the second projected image frame.

24. The system of claim 20, further comprising simultaneously displaying, on the user interface at least two of the following: the image frame zoomed in on the 2D bounding box, the first projected image frame zoomed in on the bounding box, or the second projected image frame zoomed in on the 2D bounding box.

25. The system of claim 20, further comprising programming instructions that when executed cause the processor to identify a 3D bounding box that envelops the set of points that correspond to the object of interest.

26. The system of claim 25, wherein the programming instructions that cause the processor to identify the 3D bounding box comprise programming instructions that cause the processor to receive a second user input via a user interaction with at least one of the following while being displayed on the display: the image frame, the first projected image frame, or the second projected image frame.

27. The system of claim 26, further comprising programming instructions that cause the processor to automatically update at least another one of the following, to display the 3D bounding box, while being simultaneously displayed on the display: the image frame, the first projected image frame, or the second projected image frame.

28. The system of claim 25, further comprising programming instructions that cause the processor to store, in the data store, the 3D bounding box in association with the label.

29. The system of claim 25, wherein dimensions of the 3D bounding box are determined based on at least dimensions of the object of interest in the 2D image.

30. The system of claim 18, wherein the programming instructions that cause the processor to identify the label comprise programming instructions that cause the processor to receive the label from a user.

31. The system of claim 18, wherein the programming instructions that cause the processor to identify the label comprise programming instructions that cause the processor to identify the label automatically as the label associated with the object of interest it the 2D image.

32. The system of claim 18, wherein the 2D image is a camera image that includes an identical scene as the 3D image and is captured within a threshold time as the point cloud data in the 3D image.

33. The system of claim 18, wherein the point cloud data is captured using a LIDAR sensor.

34. The system of claim 18, further comprising programming instructions that cause the processor to use the stored set of points that correspond to the object of interest in association with the label for training a machine learning model, the machine learning model configured for controlling an autonomous vehicle.

* * * * *